United States Patent [19]

Yagi et al.

[11] Patent Number: 5,387,931
[45] Date of Patent: Feb. 7, 1995

[54] CARRIER LEVEL BALANCING CIRCUIT FOR COLOR CAMERA

[75] Inventors: Osamu Yagi; Toru Wakagi, both of Tokyo, Japan

[73] Assignee: Sony Corporation, Tokyo, Japan

[21] Appl. No.: 50,652

[22] Filed: Apr. 22, 1993

[30] Foreign Application Priority Data

Apr. 27, 1992 [JP] Japan .................. 4-136058

[51] Int. Cl.[6] .................. H04N 9/64; H04N 9/07
[52] U.S. Cl. .................... 348/223; 348/655
[58] Field of Search .............. 358/29, 43, 44, 48, 358/29 C, 41; H04N 9/64, 9/07; 348/223, 655, 658

[56] References Cited

U.S. PATENT DOCUMENTS

| | | | |
|---|---|---|---|
| 4,638,352 | 1/1987 | Noda et al. | 358/43 |
| 4,714,955 | 12/1987 | Nishimura et al. | 358/48 |
| 4,860,092 | 8/1989 | Hieda | 358/44 |
| 5,198,890 | 3/1993 | Suga | 358/29 C |

Primary Examiner—James J. Groody
Assistant Examiner—Glenton B. Burgess
Attorney, Agent, or Firm—Hill, Steadman & Simpson

[57] ABSTRACT

A carrier level balancing circuit in which a color aliasing signal occurring when a cameraman takes a picture of an object of an achromatic (black and white) color can be canceled completely. In a carrier level balancing circuit for a color camera formed of a CCD solid state image pickup device of an all pixel separately read out system, two-channel color signals output from the CCD solid state image pickup device are multiplied with independent balance coefficients at every line by multipliers while the balance coefficients are switched in a dot-sequential fashion. Also, values of these balance coefficients are set by a coefficient setting circuit in response to color temperature information. Thus, the carrier levels can be balanced over a range of color temperatures.

6 Claims, 3 Drawing Sheets

CARRIER LEVEL BALANCING CIRCUIT FOR COLOR CAMERA

BACKGROUND OF THE INVENTION

1. Field of the Invention

The present invention generally relates to carrier level balancing circuits in a color camera signal processing circuit and, more particularly, to a carrier level balancing circuit for use in a signal processing circuit of a color camera formed of a CCD (charge-coupled device) solid state image pickup device of a so-called all pixel separately read out type in which signal charges of all pixels are separately read out during one field period.

2. Description of the Prior Art

In a conventional signal processing circuit of a color camera, a color camera formed of a CCD solid state image pickup device of a so-called two-pixel mixing type in which signal charges of two pixels adjacent in the vertical direction are mixed and read out is disclosed in FIG. 12 of Japanese laid-open patent publication No. 63-301687, for example. In this kind of CCD solid state image pickup device, output signals read out by mixing two pixels at every field are respectively multiplied with proper different coefficients thereby to balance carrier levels of the respective output signals. Then, the occurrence of a color aliasing signal in a luminance signal is suppressed by generating a luminance signal from the output signal whose carrier level was balanced. Further, a CCD solid state image pickup device of an all pixel separately read out type is known to improve a vertical resolution as is disclosed in Japanese laid-open patent publication No. 63-301687.

When the carrier levels are balanced according to the aforesaid method, a color aliasing signal occurred when a cameraman takes a picture of an object of an achromatic (black and white) color can be canceled to a certain level. However, since the CCD solid state image pickup device is formed of the two-pixel mixing type, carrier levels are not always balanced due to a difference of sensitivity between pixels of a color filter. Therefore, a color aliasing signal in a luminance signal could not be canceled completely in the vertical and horizontal directions.

On the other hand, in the CCD solid state image pickup device of all pixel separately read out system, if carrier levels are not balanced by any method, then a color aliasing signal will occur in a luminance signal or the like.

OBJECTS AND SUMMARY OF THE INVENTION

Therefore, it is an object of the present invention to provide an improved carrier level balancing circuit in which the aforesaid shortcomings and disadvantages encountered with the prior art can be eliminated.

More specifically, it is an object of the present invention to provide a carrier level balancing circuit in which a color aliasing signal occurred when a cameraman takes a picture of an object of an achromatic (black and white) color can be canceled completely.

According to a first aspect of the present invention, there is provided a carrier level balancing circuit for a color camera formed of a solid state image pickup device in which signal charges of all pixels are separately read out at every two lines during one field period and then output as dot-sequential two-channel color signals. This carrier level balancing circuit comprises a first multiplier for alternately multiplying one of the two-channel color signals with first and second coefficients set in association with respective color signals in response to a color temperature information at the unit of pixel, a second multiplier for alternately multiplying the other of the two-channel color signals with third and fourth coefficients set in association with respective color signals in response to a color temperature information at the unit of pixel and an adding circuit for adding the two-channel color signals processed by the first and second multipliers by two pixels each.

According to a second aspect of the present invention, there is provided a carrier level balancing circuit which comprises a color signal converting circuit for converting two-channel color signals into a first color signal formed of a combination of pixels of the same color and a second color signal formed of a combination of pixels of different colors, a first multiplier for multiplying the first color signal with a first coefficient set in response to a color temperature information, a second multiplier for alternately multiplying the second color signal with second and third coefficients set in response to a color temperature information at the unit of pixel and an adding circuit for adding the first and second color signals from the first and second multipliers by two pixels each.

In the carrier level balancing circuit for a color camera formed of a solid state image pickup device of an all pixel separately read out type, the coefficients that are separately set at every line in response to the color temperature information are multiplied to the two-channel color signals output from the solid state image pickup device while the respective coefficients are being switched in a dot-sequential fashion thereby to balance carrier levels.

Thus, if a luminance signal and an aperture control signal, etc., are generated from these signals whose carrier levels were balanced, a color aliasing signal occurred in these luminance and aperture control signals can be completely canceled in the vertical and horizontal directions.

Furthermore, the two-channel color signals output from the solid state image pickup device are converted into the color signal formed by a combination of pixels of the same color and the color signal formed by a combination of pixels of different colors. Then, the same coefficient is constantly multiplied to these color signals with respect to the line formed by a combination of the pixels of the same color and the independent coefficients are multiplied to these color signals with respect to the line formed by a combination of the pixels of different colors in a dot-sequential fashion thereby to balance carrier levels.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Embodiments of the present invention will now be described in detail with reference to the drawings.

Figure 1:
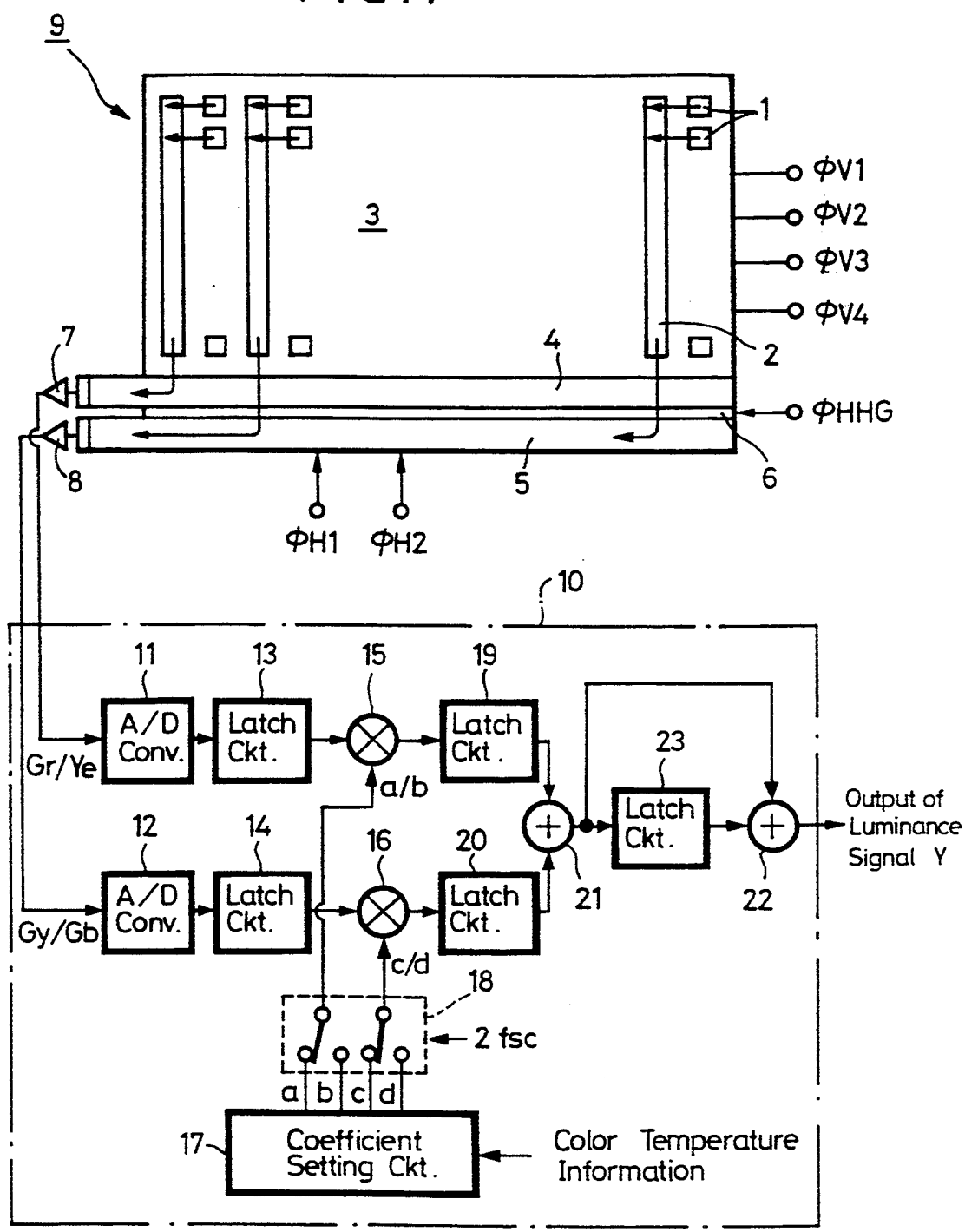
FIG. 1 is a block diagram showing a carrier level balancing circuit according to an embodiment of the present invention which is applied to the processing of a luminance signal.

FIG. 1 of the accompanying drawings is a block diagram illustrative of a carrier level balancing circuit for a color camera formed of a CCD solid state image pickup device of an all pixel separately read out type which is applied to the processing of a luminance signal. As shown in FIG. 1, an image pickup area 3 comprises a plurality of photo-sensors 1 that are arranged at the unit of pixels in a two-dimensional fashion to accumulate a signal charge corresponding to an incident light thereon and vertical CCDs 2 for transferring signal charges read out from the photo-sensors 1 at every vertical column in the vertical direction.

Figure 2:
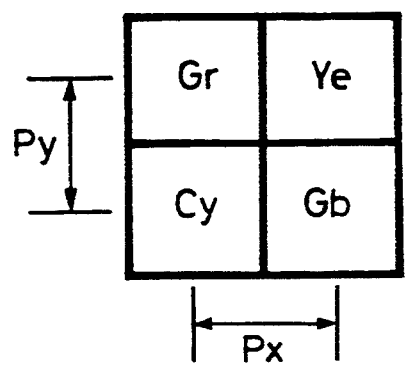
FIG. 2 is a diagram showing a color filter array of an example of a color filter.

A color filter array (not shown) is formed on the image pickup area 3, The color filter arrangement may be of the line sequential type formed of a G (green) checkered Ye (yellow)/Cy (cyan) as shown in FIG. 2 and four pixels are employed as a basic unit. In FIG. 2, reference symbol Px designates a pixel pitch in the horizontal direction and Py designates a pixel pitch in the vertical direction, respectively.

The vertical CCD 2 effects the operation corresponding to the vertical scanning and is driven by four-phase vertical transfer clocks $\phi V1$ to $\phi V4$. Two horizontal CCDs 4, 5 for transferring signal charges, transferred from the vertical CCD 2, in the horizontal direction are disposed in parallel to the output side of the vertical CCD 2.

The horizontal CCDs 4, 5 effect the operation corresponding to the horizontal scanning and are driven by two-phase horizontal transfer clocks $\phi H1$ and $\phi H2$. Signal charges of two lines each are transferred to the horizontal CCDs 4, 5 from the vertical CCD 2 and the distribution of signal charges to the two horizontal CCDs 4, 5 is effected at the unit of line by a distribution transfer gate 6 disposed between the horizontal CCDs 4, 5.

At the output sides of the horizontal CCDs 4 and 5, there are provided output sections 7, 8 that are formed of floating diffusion amplifiers to detect and convert transferred signal charges into signal voltages. These output sections 7, 8 derive two-channel pixel signals simultaneously.

Thus, the CCD solid state image pickup device 9 of all pixel separately read out type is constructed to separately read out signal charges of all pixels at every two lines during one field period and to output the same as dot-sequential two-channel pixel signals (color signals).

The two-channel output signals from the CCD solid state image pickup device 9 are supplied through a CDS (correlated double sampling) circuit (not shown) and a sample and hold circuit (not shown) to a carrier level balancing circuit 10 according to the present invention.

In the carrier level balancing circuit 10, the two-channel signals are converted into digital signals by A/D (analog-to-digital) converters 11, 12, latched by latch circuits 13, 14 which latch data of one pixel and then input to multipliers 15, 16.

The multipliers 15, 16 are supplied with carrier balance coefficients a/b and c/d which are set by a coefficient setting circuit 17 and which are alternately output from the coefficient setting circuit 17 under the control of a change-over switch 18. Thus, the carrier balance coefficients a/b and c/d are respectively multiplied to the two-channel pixel signals by the multipliers 15 and 16.

The change-over switch 18 is changed in position in response to a switching frequency of 2 fsc when a sampling frequency of the two-channel pixel signals is set to 4 fsc where fsc is the color sub-carrier frequency of the color signal.

The coefficient setting circuit 17 sets carrier balance coefficients a, b, c, and d corresponding to color signals Gr, Ye, Cy and Gb in response to a color temperature information calculated on the basis of the output signal from the CCD solid state image pickup device 9, for example. By way of example, the coefficient setting circuit 17 sets the respective carrier balance coefficients a, b, c and d such that, when a color temperature is 3200° K., a relation expressed as G:Ye:Cy=1.0:1.5:2.5 (G=Gr=Gb) is established and that, when the color temperature is 5300° K., a relation expressed as G:Ye:-Cy=1.0:2.0:2.0 (G=Gr=Gb) is established.

The two-channel pixel signals (a*Gr/b*Ye, c*Cy/d*Gb) that were multiplied with the carrier balance coefficients a/b and c/d are latched by one-bit latch circuits 19, 20 and then added with each other by an adder 21. By this adding processing in the adder 21, pixel signals of two pixels adjacent in the vertical direction are added.

An added output from the adder 21 is added with an added output of one pixel before latched in a latch circuit 23 by an adder 22. By this adding processing in the adder 22, the pixel signals of adjacent four pixels in the vertical and horizontal directions are added with one another while the color filter array shown in FIG. 2 is taken as a basic unit, and thereby being output as a luminance signal Y. The luminance signal Y at that time is constructed by the following equation:

$$Y = a*Gr + b*Ye + c*Cy + d*Gb$$

As described above, in the carrier level balancing circuit for a color camera formed of the CCD solid state image pickup device 9 of all pixel separately read out type, the independent carrier balance coefficients a, b, c, d are multiplied to the respective color signals from the CCD solid state image pickup device 9 at every lines (Gr/Ye/and Cy/Gb lines) while these coefficients a, b, c, d are being switched in a dot-sequential fashion in response to the switching clock having the frequency of 2 fsc and the values of these coefficients a, b, c, d are set in response to the color temperature information, whereby carrier levels can be balanced at all sorts of color temperatures.

Figure 3:
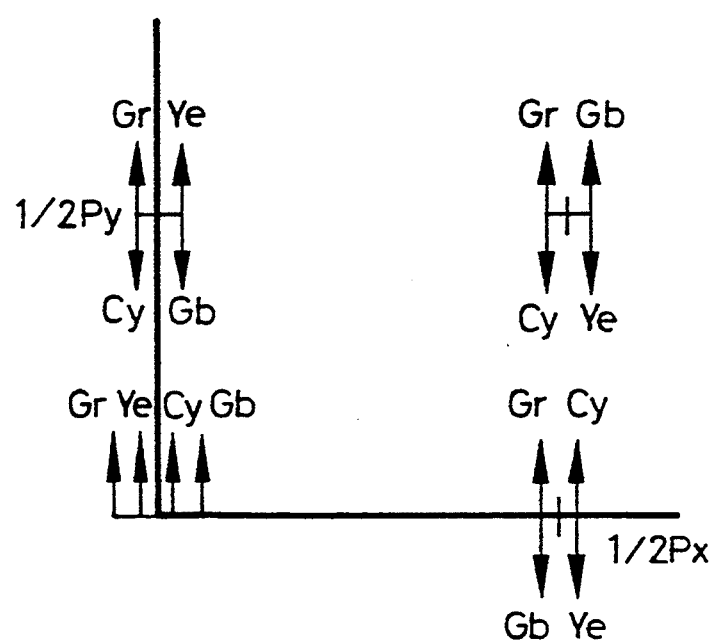
FIG. 3 is a diagram illustrative of a carrier level balanced condition in the color filter array shown in FIG. 2.

Accordingly, the carrier levels of the respective pixel signals are balanced so that the levels of all carriers of the color signals Gr, Ye, Cy and Gb become the same as shown in FIG. 3. Thus, in the luminance signal Y formed of the four pixels, the color aliasing signals can be canceled completely in the vertical, horizontal and oblique directions.

Figure 4:
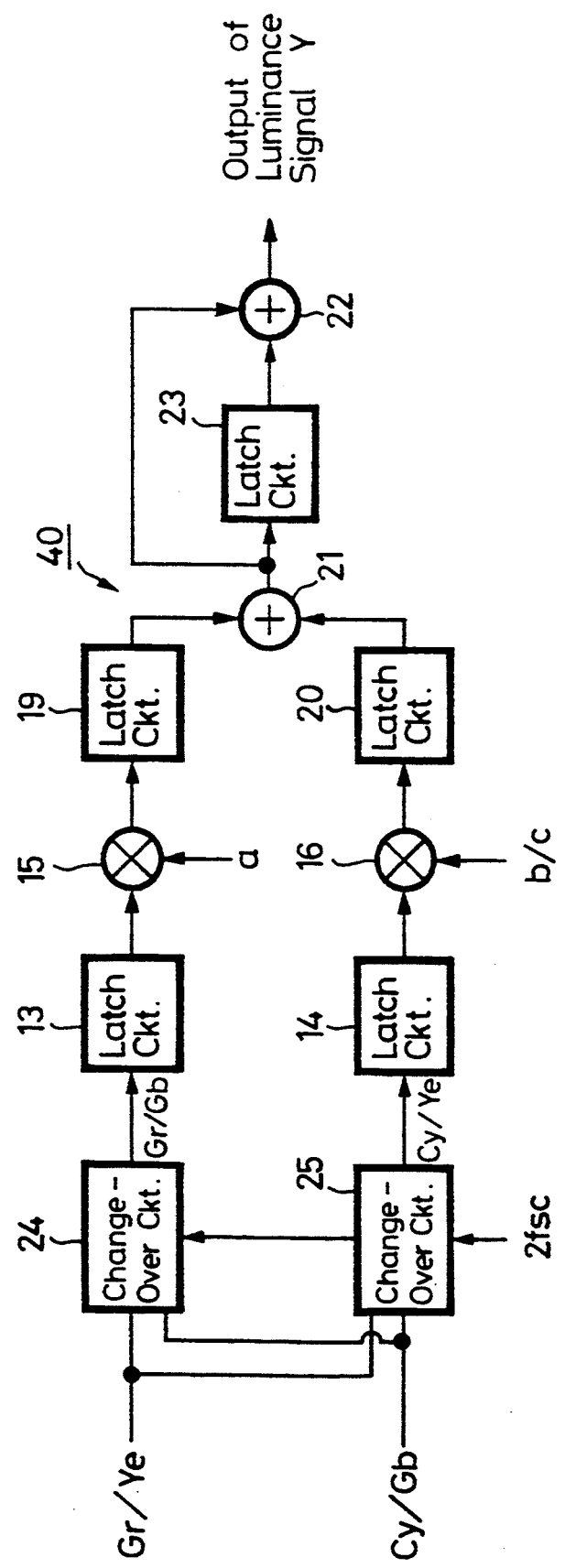
FIG. 4 is a block diagram showing a carrier level balancing circuit according to another embodiment of the present invention which is applied to the processing of a luminance signal.

FIG. 4 is a block diagram showing another embodiment of the present invention. In FIG. 4, like parts corresponding to those of FIG. 1 are marked with the same references and therefore need not be described in detail. As shown in FIG. 4, in a carrier level balancing circuit 40 according to this embodiment, the two-channel pixel signals Gr/Ye and Cy/Gb output from the CCD solid state image pickup device 9 are switched by change-over circuits 24, 25 in response to the switching clock having the frequency 2 fsc and thereby converted into respective color signals of Gr/Gb lines and Cy/Ye lines.

These color signals are constantly multiplied with the same carrier balance coefficient a by the multiplier 15 with respect to the Gr/Gb lines because the signals Gr and Gb are considered to be the G signals of the same level. On the other hand, these color signals are respectively multiplied with independent carrier balance coefficients b and c by the multiplier 16 with respect to the Cy/Ye lines in a dot-sequential fashion. These carrier balance coefficients a, b and c are set by a coefficient setting circuit (not shown) in response to the color temperature information.

The multiplied results are added by the adder 21 and the added output from the adder 21 is added with an added output of one pixel before latched by the latch circuit 23 by the adder 22 which thus derives the luminance signal Y. The luminance signal Y at that time is constructed by the following equation:

$$Y = a*(Gr + Gb) + b*Ye + c*Cy$$

According to the circuit arrangement shown in FIG. 4, it is sufficient to provide three carrier balance coefficients a, b and c that are set in response to the color temperature information.

According to the second embodiment of the present invention, the carrier levels of respective color signals can be balanced at all sorts of color temperatures similarly to the first embodiment. Therefore, the color aliasing signals can be completely canceled in the vertical, horizontal and oblique directions.

While the carrier level balancing circuit of the present invention is applied to the luminance signal processing as described above, the present invention is not limited thereto and the same circuit arrangement of this carrier level balancing circuit can be applied to an aperture control signal that controls an aperture correcting circuit for correcting a high frequency component signal from a circuit standpoint or the like. Therefore, the processing of the aperture control signal in which the color aliasing signal can be prevented from occurring becomes possible.

As described above, according to the present invention, in the carrier level balancing circuit for a color camera formed of the solid state image pickup device of all pixel separately read out type, the coefficients that are independently set in response to the color temperature information are multiplied to the two-channel color signals output from the solid state image pickup device while the respective coefficients are being switched in a dot-sequential fashion thereby to balance carrier levels. Thus, if a luminance signal and an aperture control signal, etc., are generated from these signals whose carrier levels were balanced, there is then the effect that the color aliasing signals of these luminance and aperture control signals can be completely canceled in the vertical and horizontal directions.

Furthermore, the two-channel color signals output from the solid state image pickup device are converted into the color signal formed by a combination of pixels of the same color and the color signal formed by a combination of pixels of different colors. Then, the same coefficient is constantly multiplied to these color signals with respect to the line formed of a combination of the pixels of the same color and the independent coefficients are multiplied to these color signals with respect to the line formed of a combination of the pixels of different colors in a dot-sequential fashion thereby to balance carrier levels. Therefore, in addition to the above-mentioned effect, there can be achieved the effect such that only three carrier balance coefficients are set.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A carrier level balancing circuit for a color camera formed of a solid state image pickup device in which signal charges of all pixels are separately read out at every two lines during one field period and dot-sequential two-channel color signals are output in a basic unit of pixel, comprising:
   a first multiplier for alternately multiplying one of said two-channel color signals with first and second coefficients set in association with respective color signals in response to a color temperature information at the unit of pixel;
   a second multiplier for alternately multiplying the respective other of said two-channel color signals with third and fourth coefficients set in association with respective color signals in response to a color temperature information at the unit of pixel; and
   an adding circuit for adding said two-channel color signals from said first and second multipliers by two pixels each.

2. The carrier level balancing circuit for a color camera according to claim 1, wherein one of said two-channel color signals is formed of a dot-sequential color signal of green and yellow.

3. The carrier level balancing circuit for a color camera according to claim 1, wherein the respective other of said two-channel color signals is formed of a dot-sequential color signal of cyan and green.

4. A carrier level balancing circuit for a color camera formed of a solid state image pickup device in which signal charges of all pixels are separately read out at every two lines during one field period and dot-sequential two-channel color signals are output in a basic unit of pixel, comprising:
   switching means for converting said two-channel color signals into a first dot-sequential color signal formed of a combination of pixels of the same color and a second dot-sequential color signal formed of a combination of pixels of different colors;
   a first multiplier for multiplying said first dot-sequential color signal with a first coefficient in response to a color temperature information;
   a second multiplier for multiplying said second dot-sequential color signal with second and third coefficients in response to a color temperature information; and an adding circuit for adding outputs of said first and second multipliers, by two pixels each.

5. An output circuit for a charge transfer device according to claim 4, wherein said first dot-sequential color signal is formed of green signals of lines different from each other.

6. The carrier level balancing circuit for a color camera according to claim 4, wherein said second dot-sequential color signal is formed of cyan and yellow signals of lines different from each other.

* * * * *